(12) United States Patent
Yamada et al.

(10) Patent No.: US 8,502,415 B2
(45) Date of Patent: Aug. 6, 2013

(54) UNINTERRUPTED POWER SUPPLY UNIT

(75) Inventors: Masaki Yamada, Tokyo (JP); Akihiko Iwata, Tokyo (JP); Yoshihiro Hatakeyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 356 days.

(21) Appl. No.: 13/043,124

(22) Filed: Mar. 8, 2011

(65) Prior Publication Data

US 2011/0215648 A1 Sep. 8, 2011

Related U.S. Application Data

(62) Division of application No. 10/543,173, filed as application No. PCT/JP2004/015851 on Oct. 26, 2004, now Pat. No. 7,964,990.

(30) Foreign Application Priority Data

Oct. 27, 2003 (JP) .................................. 2003-366077

(51) Int. Cl.
*H02J 7/00* (2006.01)
(52) U.S. Cl.
USPC .......................................................... 307/66
(58) Field of Classification Search
USPC .............................................. 307/64–66, 88
See application file for complete search history.

(56) References Cited

U.S. PATENT DOCUMENTS

| | | | |
|---|---|---|---|
| 5,115,386 A | 5/1992 | Shirahama et al. | |
| 5,514,915 A | 5/1996 | Kim et al. | |
| 5,570,004 A | 10/1996 | Shibata | |
| 5,786,992 A | 7/1998 | Vinciarelli et al. | |
| 5,866,506 A | 2/1999 | Tutt et al. | |
| 5,949,668 A | 9/1999 | Schweighofer | |
| 6,034,514 A | 3/2000 | Sakai | |
| 6,621,719 B2 | 9/2003 | Steimer et al. | |
| 6,753,622 B2 | 6/2004 | Oughton | |
| 2004/0066094 A1 | 4/2004 | Suzuki et al. | |
| 2005/0116547 A1 | 6/2005 | Lin et al. | |
| 2006/0202636 A1 | 9/2006 | Schneider | |

FOREIGN PATENT DOCUMENTS

| | | |
|---|---|---|
| JP | 01-222635 | 9/1989 |
| JP | 03-056046 | 3/1991 |
| JP | 08-223822 | 8/1996 |
| JP | 11-178216 | 7/1999 |
| JP | 11-178244 | 7/1999 |
| JP | 11178216 | 7/1999 |

(Continued)

OTHER PUBLICATIONS

Bong-Hwan Kwon et al., Improved Single-Phase Line-Interactive UPS, Aug. 2001, Industrial Electronics, IEEE Transactions, vol. 48, Issue 4, pp. 804-811.

(Continued)

*Primary Examiner* — Jared Fureman
*Assistant Examiner* — Duc M Pham
(74) *Attorney, Agent, or Firm* — Oblon, Spivak, McClelland, Maier & Neustadt, L.L.P.

(57) ABSTRACT

An uninterrupted power supply unit is provided with a straightforward switch connected between a power source and a load to supply or interrupt a power to a system. The combination of the outputs from two kinds of single phase inverters enables compensating for a variation in the system voltage in the normal condition and to supply a predetermined voltage to the load after decreasing in the system voltage and opening of a straight forward switch.

13 Claims, 19 Drawing Sheets

| | FOREIGN PATENT DOCUMENTS | |
|---|---|---|
| JP | 2000-184622 | 6/2000 |
| JP | 2001-128390 | 5/2001 |
| JP | 2001-286078 | 10/2001 |
| JP | 2001-517057 | 10/2001 |
| JP | 2003-289672 | 10/2003 |

OTHER PUBLICATIONS

Amos et al., Newnes Dictionary of Electronics, 1999, Reed Educational and Professional Publishing Ltd, 4$^{th}$ edition, pp. 227,289.

|  | 1 | 2 | 4 |  |
|---|---|---|---|---|
|  | Va | Vb | Vc | Level |
|  | 0 | 0 | 0 | 0 |
|  | 1 | 0 | 0 | 1 |
|  | 0 | 1 | 0 | 2 |
|  | 1 | 1 | 0 | 3 |
|  | 0 | 0 | 1 | 4 |
|  | 1 | 0 | 1 | 5 |
|  | 0 | 1 | 1 | 6 |
|  | 1 | 1 | 1 | 7 |

*Fig. 9(a)*

|  | 1 | 2 | 5 |  |
|---|---|---|---|---|
|  | Va | Vb | Vc | Level |
|  | 0 | 0 | 0 | 0 |
|  | 1 | 0 | 0 | 1 |
|  | 0 | 1 | 0 | 2 |
|  | 1 | 1 | 0 | 3 |
|  | -1 | 0 | 1 | 4 |
|  | 0 | 0 | 1 | 5 |
|  | 1 | 0 | 1 | 6 |
|  | 0 | 1 | 1 | 7 |
|  | 1 | 1 | 1 | 8 |

*Fig. 9(b)*

|  | 1 | 2 | 6 |  |
|---|---|---|---|---|
|  | Va | Vb | Vc | Level |
|  | 0 | 0 | 0 | 0 |
|  | 1 | 0 | 0 | 1 |
|  | 0 | 1 | 0 | 2 |
|  | 1 | 1 | 0 | 3 |
|  | 0 | -1 | 1 | 4 |
|  | -1 |  | 1 | 5 |
|  | 0 | 0 | 1 | 6 |
|  | 1 | 0 | 1 | 7 |
|  | 0 | 1 | 1 | 8 |
|  | 1 | 1 | 1 | 9 |

*Fig. 9(c)*

|  | 1 | 2 | 7 |  |
|---|---|---|---|---|
|  | Va | Vb | Vc | Level |
|  | 0 | 0 | 0 | 0 |
|  | 1 | 0 | 0 | 1 |
|  | 0 | 1 | 0 | 2 |
|  | -1 | -1 | 1 | 4 |
|  | 0 | -1 | 1 | 5 |
|  | -1 | 0 | 1 | 6 |
|  | 0 | 0 | 1 | 7 |
|  | 1 | 0 | 1 | 8 |
|  | 0 | 1 | 1 | 9 |
|  | 1 | 1 | 1 | 10 |

*Fig. 9(d)*

| 1 | 3 | 4 | |
|---|---|---|---|
| Va | Vb | Vc | Level |
| 0 | 0 | 0 | 0 |
| 1 | 0 | 0 | 1 |
| -1 | 1 | 0 | 2 |
| 0 | 1 | 0 | 3 |
| 1 | 1 | 0 | 4 |
| 1 | 0 | 1 | 5 |
| -1 | 1 | 1 | 6 |
| 0 | 1 | 1 | 7 |
| 1 | 1 | 1 | 8 |

*Fig. 9(e)*

| 1 | 3 | 5 | |
|---|---|---|---|
| Va | Vb | Vc | Level |
| 0 | 0 | 0 | 0 |
| 1 | 0 | 0 | 1 |
| -1 | 1 | 0 | 2 |
| 1 | 1 | 0 | 4 |
| 0 | 0 | 1 | 5 |
| 1 | 0 | 1 | 6 |
| -1 | 1 | 1 | 7 |
| 0 | 1 | 1 | 8 |
| 1 | 1 | 1 | 9 |

*Fig. 9(f)*

| 1 | 3 | 6 | |
|---|---|---|---|
| Va | Vb | Vc | Level |
| 0 | 0 | 0 | 0 |
| 1 | 0 | 0 | 1 |
| -1 | 1 | 0 | 2 |
| 0 | 1 | 0 | 3 |
| 1 | 1 | 0 | 4 |
| -1 | 0 | 1 | 5 |
| 0 | 0 | 1 | 6 |
| 1 | 0 | 1 | 7 |
| -1 | 1 | 1 | 8 |
| 0 | 1 | 1 | 9 |
| 1 | 1 | 1 | 10 |

*Fig. 9(g)*

| 1 | 3 | 7 | |
|---|---|---|---|
| Va | Vb | Vc | Level |
| 0 | 0 | 0 | 0 |
| 1 | 0 | 0 | 1 |
| -1 | 1 | 0 | 2 |
| 0 | 1 | 0 | 3 |
| 1 | 1 | 0 | 4 |
| 1 | -1 | 1 | 5 |
| -1 | 0 | 1 | 6 |
| 0 | 0 | 1 | 7 |
| 1 | 0 | 1 | 8 |
| -1 | 1 | 1 | 9 |
| 0 | 1 | 1 | 10 |
| 1 | 1 | 1 | 11 |

*Fig. 9(h)*

| 1 | 3 | 8 | |
|---|---|---|---|
| Va | Vb | Vc | Level |
| 0 | 0 | 0 | 0 |
| 1 | 0 | 0 | 1 |
| -1 | 1 | 0 | 2 |
| 0 | 1 | 0 | 3 |
| 1 | 1 | 0 | 4 |
| 0 | -1 | 1 | 5 |
| 1 | -1 | 1 | 6 |
| -1 | 0 | 1 | 7 |
| 0 | 0 | 1 | 8 |
| 1 | 0 | 1 | 9 |
| -1 | 1 | 1 | 10 |
| 0 | 1 | 1 | 11 |
| 1 | 1 | 1 | 12 |

*Fig. 9(i)*

| 1 | 3 | 9 | |
|---|---|---|---|
| Va | Vb | Vc | Level |
| 0 | 0 | 0 | 0 |
| 1 | 0 | 0 | 1 |
| -1 | 1 | 0 | 2 |
| 0 | 1 | 0 | 3 |
| 1 | 1 | 0 | 4 |
| -1 | -1 | 1 | 5 |
| 0 | -1 | 1 | 6 |
| 1 | -1 | 1 | 7 |
| -1 | 0 | 1 | 8 |
| 0 | 0 | 1 | 9 |
| 1 | 0 | 1 | 10 |
| -1 | 1 | 1 | 11 |
| 0 | 1 | 1 | 12 |
| 1 | 1 | 1 | 13 |

*Fig. 9(j)*

| Va | Vb | Vc | Level |
|---|---|---|---|
| 1 | 3 | 9 | |
| 0 | 0 | 0 | 0 |
| 1 | 0 | 0 | 1 |
| -1 | 1 | 0 | 2 |
| 0 | 1 | 0 | 3 |
| 1 | 1 | 0 | 4 |
| -1 | -1 | 1 | 5 |
| 0 | -1 | 1 | 6 |
| 1 | -1 | 1 | 7 |
| -1 | 0 | 1 | 8 |
| 0 | 0 | 1 | 9 |
| 1 | 0 | 1 | 10 |
| -1 | 1 | 1 | 11 |
| 0 | 1 | 1 | 12 |
| 1 | 1 | 1 | 13 |

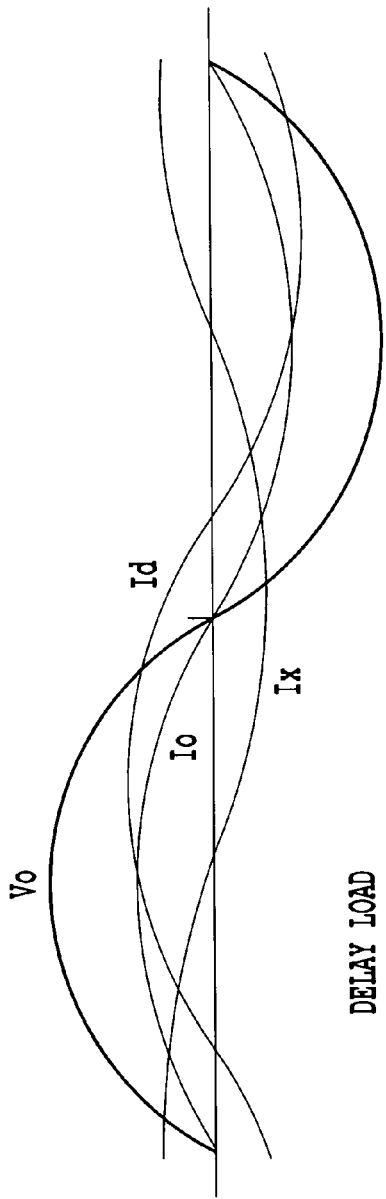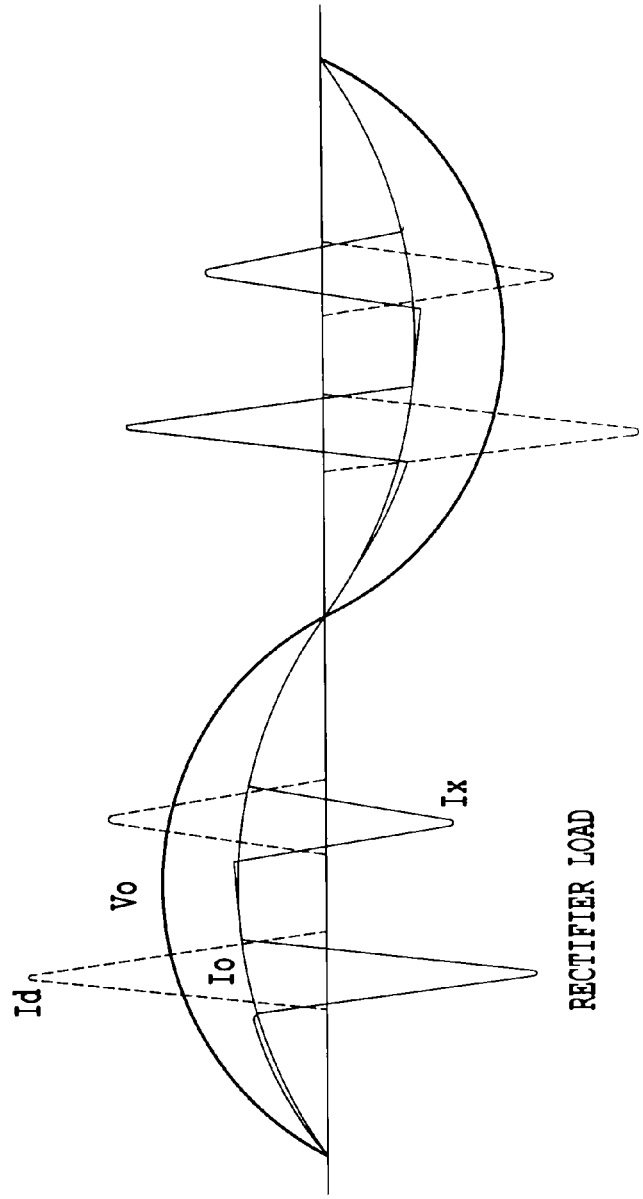

US 8,502,415 B2

UNINTERRUPTED POWER SUPPLY UNIT

CROSS-REFERENCE TO RELATED APPLICATIONS

The present application is a divisional of U.S. application Ser. No. 10/543,173 filed on Jul. 22, 2005, which is a 371 of PCT/JP04/15851 filed on Oct. 26, 2004, and claims priority to JP 2003-366077 filed on Oct. 27, 2003, the entire contents of each of which are hereby incorporated herein by reference.

TECHNICAL FIELD

The present invention relates to an uninterrupted power supply unit, in particular, to the uninterrupted power supply unit having a straightforward switch connected in series with a system.

BACKGROUND ART

Heretofore, a variety of circuitry of the uninterrupted power supply units have been proposed as disclosed in, for example, Japanese Patent Laid-open Publication JP 01-222635 (referred to as Patent Document 1) and Japanese Patent Laid-open Publication JP 08-223822 (referred to as Patent Document 2).

One conventional uninterrupted power supply unit shown in Patent Document 1 is provided with a constant voltage/constant frequency power supply unit (CVCF) in which an alternative current (AC) input voltage is once converted into a direct current (DC) voltage, then the converted DC voltage is reversely converted into the AC voltage again, and a bypass circuit comprising semiconductor switches which bypass the CVCF. Such power supply unit is constituted so that in a normal voltage condition as well as in a dropped voltage condition the AC is once converted into the DC through a converter and the DC is again converted into the AC with an inverter. As a result, the current is always passed through semiconductors even in the normal voltage condition, causing to give rise to a loss of power, to reduce a total efficiency of the whole unit, and to upsize a cooling device. There also exists a problem that since an output of the inverter requires PWM controlled-rectangular wave, a filter for filtering the output wave must be upsized.

Another conventional uninterrupted power supply unit shown in Patent Document 2 is constituted so that in normal condition a commercial line is directly connected through the straightforward switch to the load, but in the case where a voltage of the commercial line is decreased to less than a given value, the straightforward switch is cut off and a battery power is supplied to the load through the inverter and a step-up transformer. In such configuration, since the step-up transformer is required to have a function for filtering a rectangular voltage generated in the inverter, and to transmit a voltage having a commercial frequency, the problem exists in that the product of voltage and time, that is, flux volume, is required to be a large value, resulting in the system of upsized and expensive construction.

Patent document 1:
Japanese Patent Laid-open Publication JP 01-222635
Patent document 2:
Japanese Patent Laid-open Publication JP 08-223822

DISCLOSURE OF THE INVENTION

Problems to be Solved by the Invention

The present invention has been made to solve the above described problems, and it is an object thereof to obtain an uninterrupted power supply unit which is capable to compensate a variation in the system voltage in the normal condition, and to supply a predetermined voltage to the load even after the system voltage has been dropped to less than a predetermined value and the straightforward switch has been cut off, by combining two kinds of single phase inverters.

There is provided an uninterrupted power supply unit according to the invention, wherein the straightforward switch is connected between a power source and a load to supply or interrupt the electric power toward the system, a first single phase inverter is connected in parallel with the load, a second single inverter is connected in series with the load, and a battery is connected to the DC side of the first and second single inverters.

Advantages of the Invention

In an uninterrupted power supply unit according to the invention, there are advantages in which a combination of the single phase inverters enables increasing voltage compensation and decreasing voltage compensation, thereby achieving voltage compensation at a time of power failure and supplying a stabilized voltage to the load in any voltage condition.

BEST MODES FOR IMPLEMENTING THE INVENTION

Embodiment 1

FIG. 1 shows a schematic circuit diagram of an uninterrupted power supply unit according to Embodiment 1 of the present invention. In FIG. 1, a power source 1 is a commercial alternating current source normally having a system voltage $V_0$, directly supplying a power to the load 2 via a straightforward switch 3 which is a mechanical switch such as a relay. The load 2 is connected to a first single phase inverter 4 of which AC side terminals are connected in parallel with the load 2 and a second single phase inverter 5 of which AC side terminals are connected in series with the load 2. The DC side terminals of the first single phase inverter 4 is connected to a DC-DC converter 6 through a capacitor C1, and the DC side terminals of the second single phase inverter 5 is connected to a DC-DC converter 7 through a capacitor C2. The other side terminals of the DC-DC converters 6, 7 are connected to a battery 8 in common.

Herein, the single phase inverters 4, 5 could be constituted with a known single-phase bridge configuration comprising semiconductor elements such as MOSFETs, for example, and diodes connected in reversely parallel with each of the semiconductor elements. The DC-DC converter 6, 7 could also be constituted with a known construction in which the DC voltage inputted is converted into the AC by a switching circuit comprising a MOSFET and a control IC, the AC voltage converted is changed by a transformer and then rectified into the DC to obtain the other DC voltage different from the input voltage. Reference numeral 9 denotes a smoothing filter, 10 denotes an abnormal voltage drop detecting circuit. In addition, the straightforward switch 3 could be constructed with a semiconductor switch such as a thyristor besides the mechanical switch such as a relay.

An operation of the uninterrupted power supply unit shown in FIG. 1 will be explained next referring to FIG. 2. In the normal condition, the straightforward switch 3 is closed and the system voltage $V_0$ is directly supplied from the power source 1 to the load 2. The single phase inverters 4, 5 are operated as a rectifier and charge the battery 8 via DC-DC converters 6, 7 respectively. Meanwhile, although not shown in the drawing, it is possible to short the AC side terminals of the single phase inverter 5 by another relay and to charge the battery 8 by the single phase inverter 4 only, in order to lower the loss.

Next, an explanation will be given to a voltage compensation operation in case when the power source 1 is cut off or when the system voltage $V_0$ is abnormally went down at the time t0 as shown in FIG. 2(*a*).

First, the abnormal voltage drop detecting circuit 10 is activated to detect the abnormality and operated to cut off the relay 3, but the current Io at the time when the relay 3 is cut off must be controlled so as to become zero, otherwise the current will be continued through an arc generated by that cutting off. It is controlled therefore in the way that V1 is PWM-controlled by the inverter 4 and then is filtered by the smoothing filter 9 so that output voltages of the inverters become equal to the system voltage Vo. As the result, the voltage between the both terminals of the relay will be zero and the relay is completely cut off at the time the current becomes zero subsequently.

After cutting off of the relay, each single phase inverter 4, 5 perform a full inverter operation and is inputted a DC voltage V1, V2 from the battery 8 through the DC-DC converter 6, 7. Here, the voltage V1 is set to the value larger than the voltage V2, and V1+V2 is set to be the maximum absolute voltage value of the system voltage V0 (that is, 141V in case of AC 100V). At the time t1, each single phase inverter 4, 5 outputs the output voltage VB1,VB2 which corresponds to the input voltage V1, V2, respectively, the output voltages VB1,VB2 are superimposed each other to generate a pseudo-sinusoidal wave as shown in the drawing and are supplied to the load. Namely, the combination of the output patterns from the first single phase inverter 4 and the second single phase inverter 5 generates four kinds of voltages; V2, V1−V2, V1, V1+V2, and a pseudo-sinusoidal wave can be formed by selecting combination thereof.

In FIG. 2(*a*), it is apparent that a pseudo-sinusoidal wave can be formed by superimposing any output voltages of the waveforms VB1, VB2 and VB1+VB2. FIG. 2(*b*) illustrates a typical output pattern obtained by the voltage relation of V1:V2, wherein in case of V1:V2=3:1, a pseudo-sinusoidal wave has equally leveled steps, and in case of V1:V2>3:1, a pseudo-sinusoidal wave has an elongate intermediate voltage.

As described above, a voltage compensation operation can be performed to supply a predetermined voltage to the load, even after the system voltage dropped below a predetermined value and the straightforward switch has been cut off.

Next, a voltage increasing or decreasing operation in case where the system voltage is decreased or increased will be explained with reference to FIG. 3.

In the drawing, Vo designates a system voltage, which is lowered as a time lapses, and Vd is a voltage applied to the load, which is shown together with the waveforms of VB1 and VB2.

An example here is shown in which the voltage abnormality (lowering) will be detected at the time t0, and the voltage compensation will be taken place at the time t1. The second single phase inverter 5 is operated so that the load voltage Vd is increased from the time t1, whereby a maximum value of the voltage supplied to the load becomes substantially equal to that in the normal voltage condition. FIG. 4 shows a variety of patterns of voltage increasing waveforms.

In FIG. 4, A represents a system voltage in the normal voltage condition (dotted line) and a system voltage V0 in the dropped voltage condition, B represents the waveform in which VB2 is evenly added all over the range of the system voltage to the dropped system voltage. In this case, the effective value of the voltage applied to the load becomes slightly larger than that in the normal voltage condition.

C represents an example of the waveform in which VB2 is added to the dropped system voltage during a certain fixed width on the way from the rising edge of the sinusoidal waveform. In this case, it is possible for the effective voltage applied to the load to coincide with the value in the normal voltage condition by controlling the pulse width of VB2 to be outputted. This provides excellent convenience to the load in which the effective value of the voltage becomes important.

Incidentally, B and C show the cases where the maximum value of the waveform coincides with that in the normal voltage condition. D, on the contrary, shows the case where the maximum value of the waveform is larger than that in the normal voltage condition. In this case, VB2 is set to the relatively narrower pulse width than that of A or B to control the effective voltage applied to the load. Further, E, F, and G show the examples where VB2 are controlled so that the maximum values of the waveform applied to the load become constant (constant width). This provides a reliable waveform compensation to the load in which the maximum value of the waveform becomes critical.

On the other hand, FIG. 5 shows a variety of patterns of voltage decreasing waveforms in the case where the system voltage V0 is increased over a predetermined value.

In FIG. 5, A represents a system voltage (dotted line) in the normal voltage condition and a system voltage V0 in the raised voltage condition, B represents the waveform in which VB2 is evenly subtracted all over the range of the system voltage from the raised system voltage. In this case, the effective value of the voltage applied to the load becomes slightly smaller than that in the normal voltage condition.

C represents an example of the waveform in which VB2 is subtracted from the raised system voltage during a certain fixed width on the way from the rising edge of the sinusoidal waveform. In this case, it is possible for the effective voltage applied to the load to coincide with the value in the normal voltage condition by controlling the pulse width of VB2 to be outputted. This provides excellent convenience to the load in which the effective value of the voltage becomes important.

Incidentally, B and C show the cases where the maximum value of the waveform coincides with that in the normal voltage condition. D, on the contrary, shows the case where the maximum value of the waveform is larger than that in the normal voltage condition. In this case, VB2 is set to the relatively narrower pulse width than that of A or B to control the effective voltage applied to the load. Further, E and F show the examples where VB2 are controlled so that the maximum values of the waveform applied to the load become constant. This provides a reliable waveform compensation to the load in which the maximum value of the waveform becomes critical.

Embodiment 2

FIG. 6 shows a modified example of the embodiment 1 according to the embodiment 2 of this invention, and is same with FIG. 1 except that the second single phase inverter 5 is directly connected to the battery 8. The voltage compensation operation that is the voltage increasing/decreasing operation is identical to that in the embodiment 1. By taking this configuration, the voltage V2 inputted to the second single phase inverter 5 becomes constant, and although it is not possible to set the ratio of V1:V2 finely, it becomes possible to manufacture in simpler and inexpensive construction, because of an omission of DC-DC converter 7.

Embodiment 3

FIG. 7 shows the modified example of the uninterrupted power supply unit according to the voltage increasing/decreasing operation of the present invention. Although, in FIG. 1 and FIG. 6, the second single phase inverter 5 is connected between the first single phase inverter 4 and the load 2, the second single phase inverter 5 in FIG. 7 is connected between the system power source 1 and the first single phase inverter 4. In this configuration, the following operation differs from that of the above embodiments.

First, in the mode in which the relay current is controlled to zero when the system voltage dropped and the relay got into a cutting-off operation, only the first single phase inverter 4 is used for PWM control in the previous embodiments, but in this embodiment, the total of the output voltages of both the first single phase inverter 4 and the second single phase inverter 5 are applied to the relay to finely control the relay current by the individual control of each output voltage, enabling cutting off of the relay reliably and rapidly.

When the relay 3 is next opened and the compensation voltage is supplied to the load, the first single phase inverter 4 alone is operated. In this situation, the first single phase inverter 4 is PWM-controlled and delivers a sinusoidal waveform in cooperation with the smoothing filter 9. If the first single phase inverter 4 is not PWM-controlled, the rectangular wave will be delivered. Therefore, this embodiment provides a high efficiency in the unit, because the second single phase inverter 5 is not used as in the previous embodiments.

Incidentally, in the uninterrupted power supply unit according to Embodiments 1 to 3, there is a possibility in the voltage increasing/decreasing operation or the voltage compensation operation that the direct current voltage V1, V2 of the single phase inverter 4, 5 deviates from a predetermined relation, because of discrepancy in the total output current of each inverter 4, 5. In order to compensate the deviation, the DC-DC converter 6, 7 is operated as follows.

The voltage V2 tends to surely decrease in the voltage increasing operation. For the reason, the energy is once sent from the DC-DC converter 6 to the battery 8 in the example of FIG. 1 and is then supplied to V2 via the DC-DC converter 7. In this case, the voltage V1 is apt to drop rapidly, but the energy can be supplied from the system to V1 by bringing the single phase inverter 4 to conduction when the instantaneous value of the system voltage is higher than V1. On the contrary, the voltage V2 is apt to raise more in the voltage decreasing operation, but the energy is once sent from the DC-DC converter 7 to the battery 8 and is then supplied to V1 via the DC-DC converter 6.

The energy sent to V1 is returned to the system via the single phase inverter 4 by bringing the single phase inverter 4 to conduction during a time period when V1 is higher than the instantaneous value of the system voltage.

The voltage increasing/decreasing operation described above is similar to that in Embodiment 2 shown in FIG. 6, but the voltage itself is controlled by the battery voltage because the inflow or outflow of energy to or from V2 is managed by the battery 8 as a buffer. The energy is flowed in or out to or from V1 by the DC-DC converter 6, and flowed out to the system so that the change of energy in the battery 8 becomes to zero in total. Embodiment 3 shown in FIG. 7 has also same operation with that in FIG. 6. As explained above, the battery 8 is used not so as to build up the current or not so as to consume the battery current by using of the DC-DC converter. As the result, there are effects that effective current of the battery is reduced and the deterioration of the battery is prevented. In addition, the energy inflow/outflow operation by the DC-DC converter is functioned even in the voltage compensation operation, for example, the DC-DC converter 6, 7 in Embodiment 1 (FIG. 1) or the DC-DC converter 6 in Embodiment 2 (FIG. 6) is operated so as to stabilize V1, V2 respectively, to maintain a predetermined voltage compensation waveform.

Embodiment 4

FIG. 8 shows a modified example according to the embodiment 4 of this invention, wherein single phase inverters 4a, 4b, and 4c are replaced to the single phase inverter 4 in the embodiment 1. In FIG. 8, the direct current voltage VB4 of the inverter 4c is stabilized through the bi-directional DC-DC converter 6a from the battery 8, and the voltage VB4 and the direct current voltages VB1, VB2, and VB3 of the single phase inverters 5, 4a, and 4b are stabilized by the bi-directional DC-DC converter 7a. The DC-DC converter 7a is therefore controlled so that each of the output voltages of the single phase inverters 4a, 4b, and 4c has always a specific relationship each other.

FIG. 9 shows a relationship among each of the output voltages of the single phase inverters 4a, 4b, and 4c and an example of the total output level of the output voltages. It includes 10 examples from the relationship shown in A in which the rate of the output voltages of the single inverters 4a, 4b, and 4c has 1:2:4, to the relationship shown in J in which the rate has 1:3:9. In case where the rate of the relationship is 1:3:9, most numbers of output levels can be outputted as shown in FIG. 10, wherein voltage patterns in that condition and an image of pseudo-sinusoidal waveform to be outputted are shown. This makes it possible to change in 13 voltage levels at the most to generate a pseudo-sinusoidal waveform with a relatively fine waveform control. FIG. 11 shows an example where PWM controlling is taken place in each of output levels, whereby an average waveform is controlled by setting a change in each output level as a minimum unit and by adjusting a frequency of up-and-down in level.

By doing such control, the total voltage waveform can be controlled in much greater detail over the wide range from VB2 to VB4, causing the smoothing filter 9 to much smaller capacity than that of a conventional device.

The operation of the system in the normal voltage condition will be next explained. In this condition, the single phase inverters 4a, 4b, and 4c is operated as a reactive power compensation device, of which operation is illustrated in FIG. 12. FIG. 12(a) shows where a load is a phase-delay element, that is, a load current Id is in phase lug with the system voltage V0, where the single phase inverters 4a, 4b, and 4c are operated to flow current Ix in the system so that system current I0 becomes in phase with system voltage V0. In other words, the single phase inverters 4a, 4b, and 4c is controlled so as to allow current Ix to flow into the system by adjusting each output level or by PWM-controlling in cooperation with the smoothing effect of the filter. This brings system current and system voltage to the identical phase each other, thereby it seems from the system side that a load of power-factor 1 is connected to the system, compensating reactive power and preventing harmonic component from flowing back to the system. Further, the current flowing in the system is decreased in its effective value, resulting in lowering loss in a cable and so on.

FIG. 12(b) shows an example of operation where a load is a rectifier element, that is, as same with that in FIG. 12(a), the single phase inverters 4a, 4b, and 4c are operated to allow current Ix to flow into the system so that the system current I0 of power factor 1 flows in the system. As it is possible for the single phase inverters 4a, 4b, and 4c to make a detailed waveform control, the unit can be controlled so that the system current I0 of power factor 1 flows surely in the system even in the case where the rectifier load is accompanied by an intense current change. This is because it is possible to raise a gain of a control system by enabling to use the smoothing filter 9 of a small capacity. In such operation, however, the amount of currents flowing in or out from the inverters 4a, 4b, and 4c are mostly different each other, so that the voltage balance among voltages VB2-VB4 will be easily come undone. In order to compensate such unbalance, as explained above, the DC-DC converter 7a is operated so that it exchanges energies so as to keep a given voltage value respectively among the voltages VB2-VB4.

As for the single phase inverter 5, it is same with that in the embodiment 1, therefore, the voltage increasing or decreasing function in the single phase inverter 5 is identical to that in the embodiment 1. That is, the change in the voltage VB1 at the time of voltage increasing or decreasing is stabilized by flowing in or out energies from VB4. Energies sent to VB4 are flowed in or out from the system by current controlling with the inverters 4a, 4b, and 4c. In addition, reactive power compensating control and voltage increasing or decreasing control described above can be simultaneously performed, and in the case where reactive power compensating control and voltage increasing control are simultaneously performed, it can be done by flowing the current lower than Ix compensating the component of reactive power into the system, and in the case where reactive power compensating control and voltage decreasing control are simultaneously performed, it can be done by flowing the current greater than Ix compensating the component of reactive power into the system.

The operation of the voltage compensating control according to the embodiment 4 will be next explained referring to FIG. 13. In the drawing, pattern (a) shows a waveform in case of where PWM control is not used concurrently, pattern (b) shows a waveform in case of concurrent use of PWM control. When the system voltage is dropped at the time t0, the relay is cut off based on the detection of that dropping, and at the same time, the single phase inverters 4a, 4b, and 4c are controlled to generate the same voltage as the system voltage so that the current flowing through the relay becomes zero. This brings the relay current to zero gradually, and the relay is completely opened before long. The operation in that moment is shown in the time interval Ta in the pattern (a), on the other hand, the operation in which the output voltage of the single phase inverters 4a, 4b, and 4c are controlled in more detail by concurrent use of PWM control is shown in the time interval Tc in the pattern (b), wherein the relay current can be rapidly dropped to zero. After the complete opening of the relay, the compensated output power is supplied to the load at the time t1 or later by controlling the single phase inverters 5, 4a, 4b, and 4c, wherein the output waveform mentioned is shown in the time interval Tb or Td.

It is thought to be several patterns as a control method for the single phase inverters 5, 4a, 4b, and 4c. For example, when the DC-DC converter 7a is controlled so that the voltage balance among the single phase inverters 5, 4a, 4b, and 4c becomes to 5:4a:4b:4c=1:3:9:27, the sinusoidal waveform being up to 40 levels can be formed, obtaining a substantially continuous output waveform. Further, as shown in FIG. 14, in the case where 5:4a:4b:4c=0.5:1:3:9, and the single phase inverter 5 is PWM-controlled, it is possible to obtain more detailed voltage waveform in cooperation with a filtering function of the smoothing filter 9. Even if the rate of the single phase inverter 5 is more than 0.5, the similar effects as described the above is expected by controlling the waveform by PWM as shown in FIG. 13. There are many patterns other than the above for selecting the voltage balance in 5:4a:4b:4c, whichever pattern in FIG. 9 can be expected to have the similar effects. Under operating condition for compensating, the current flowing in or out from the DC power source of the single phase inverter tends easily to develop unbalance, so that it is needless to say that the DC-DC converter 7a is likewise operated to compensate that unbalance.

Embodiment 5

FIG. 15 is a circuit diagram showing the embodiment 5 according to this invention, and illustrating a modification of the embodiment 4 (FIG. 8). This is completely same as FIG. 8 except that the DC-DC converter 6a is eliminated and the first single phase inverter 4c is directly connected to the battery 8, as a result, the voltage increasing or decreasing operation and the voltage compensating operation are exactly same to that in the embodiment 4. This configuration enables the single phase inverter 4c to have the largest output having nine kinds of voltage rates, providing the greatest amount of energies. For that reason, it is possible to take out energies directly from the battery 8 without going through the DC-DC converter 6a in the compensating mode, causing to a quite high efficiency to realize a downsized and lightweight unit.

Embodiment 6

FIG. 16 is a circuit diagram showing the embodiment 6 according to this invention, and illustrating a modification of the embodiment 4 (FIG. 8). This is completely same as FIG. 8 except that the DC-DC converter 7a is directly connected to the battery 8. Because the battery 8 always provides a constant voltage, it becomes easily possible to control the voltages of the single phase inverters 5, 4a, and 4b, causing to the effective or economical design of the DC-DC converter 7a to obtain a downsized and lightweight unit.

Embodiment 7

FIG. 17 is a circuit diagram showing the embodiment 7 according to this invention, wherein each of the single phase inverters 5, 4a, 4b, and 4c is connected to a battery 8d, 8a, 8b, and 8c, respectively as a DC source, and DC-DC converter 11 is inserted to the single phase inverters 5, 4a, 4b, and 4c in common to maintain stabilization for each DC voltage.

However, if the unbalance in the current values flowing into each battery is developed, the battery voltage becomes too high or too low, resulting in the unbalance in voltage relation among each of the single phase inverters 5, 4a, 4b, and 4c. For that reason, energies are exchanged between each battery so that DC-DC converter 11 compensates for the unbalance in the input currents to the batteries. This causes the currents flowing into or out from the battery to balance thereby promising a stabilizing operation.

Embodiment 8

FIG. 18 is a circuit diagram showing the embodiment 8 according to this invention, and an example in the case where a single phase inverter 5 is inserted between the system and the inverter group consisting of the single phase inverters 4a, 4b, and 4c. In this configuration, four single phase inverters 5, 4a, 4b, and 4c can be used for controlling the relay current to zero, enabling more detailed current control. Further, in the compensating operation after opening of the relay, the voltage is applied to the load only by the single phase inverters 4a, 4b, and 4c, not via the inverter 5, thereby resulting in smaller loss, increased efficiency, and downsized and lightweight of the unit.

BRIEF DESCRIPTION OF DRAWINGS

FIG. 9 is a chart showing a relationship among each output voltage of the respective inverter forming a group of single inverters and a total number of the output level, in Embodiment 4 of the present invention.

FIG. 12 is a chart showing a waveform at a time when a group of single inverters are operated as a reactive power compensation device, in Embodiment 4 of the present invention.

Figure 1:
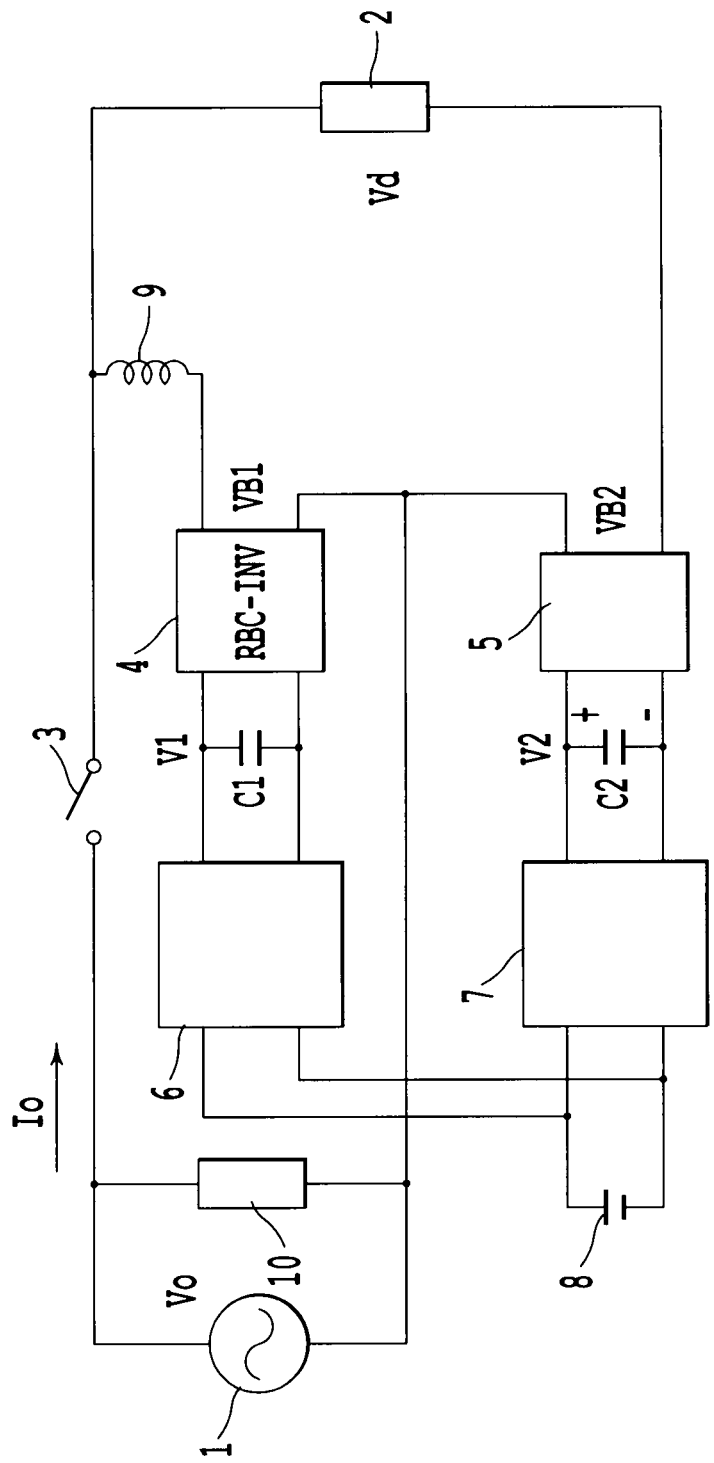
FIG. 1 is a schematic circuit diagram of an uninterrupted power supply unit according to Embodiment 1 of the present invention.
Figures 2A, 2B:
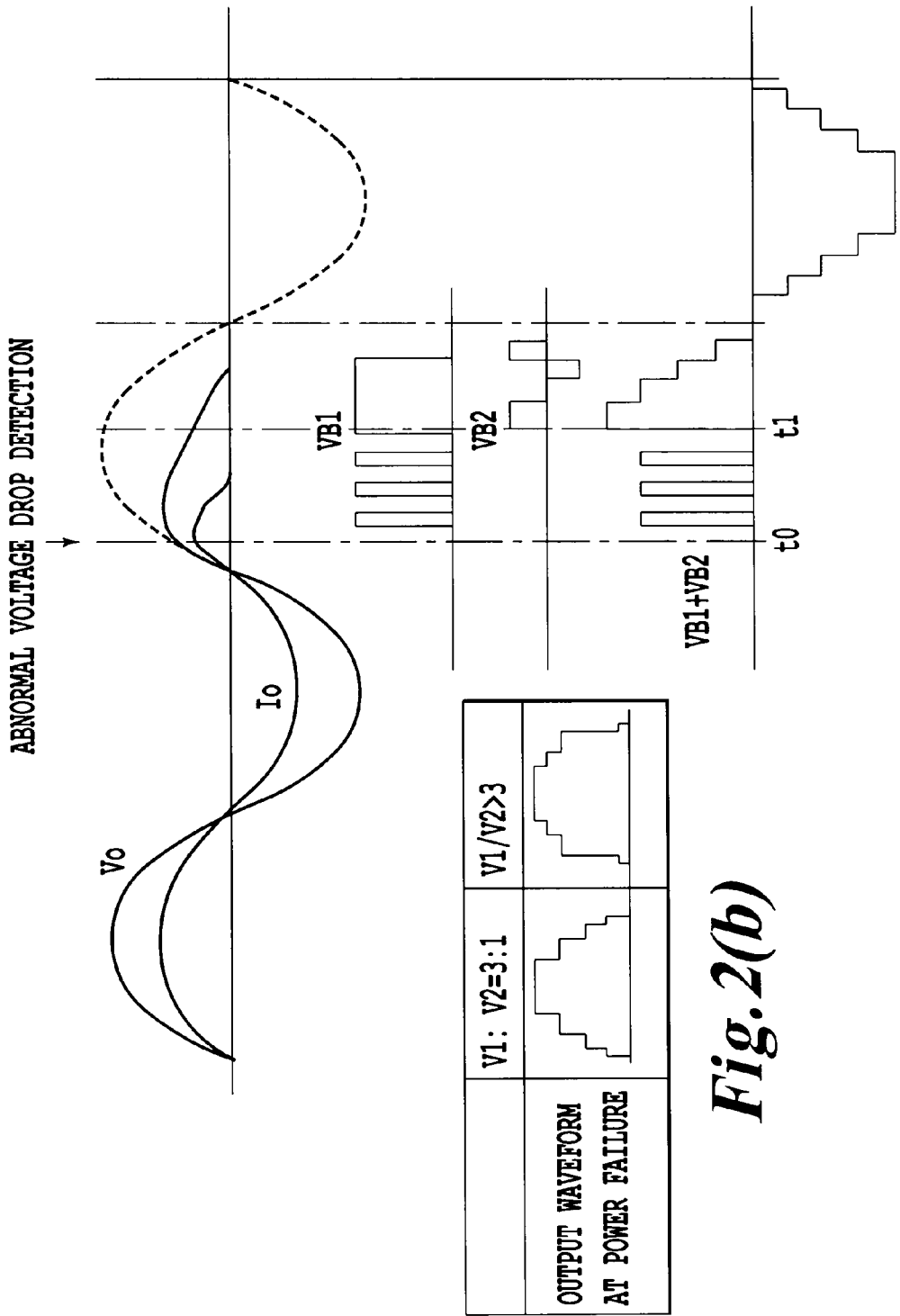
FIG. 2 is an explanatory diagram for a voltage compensating operation of the uninterrupted power supply unit shown in FIG. 1.
Figure 3:
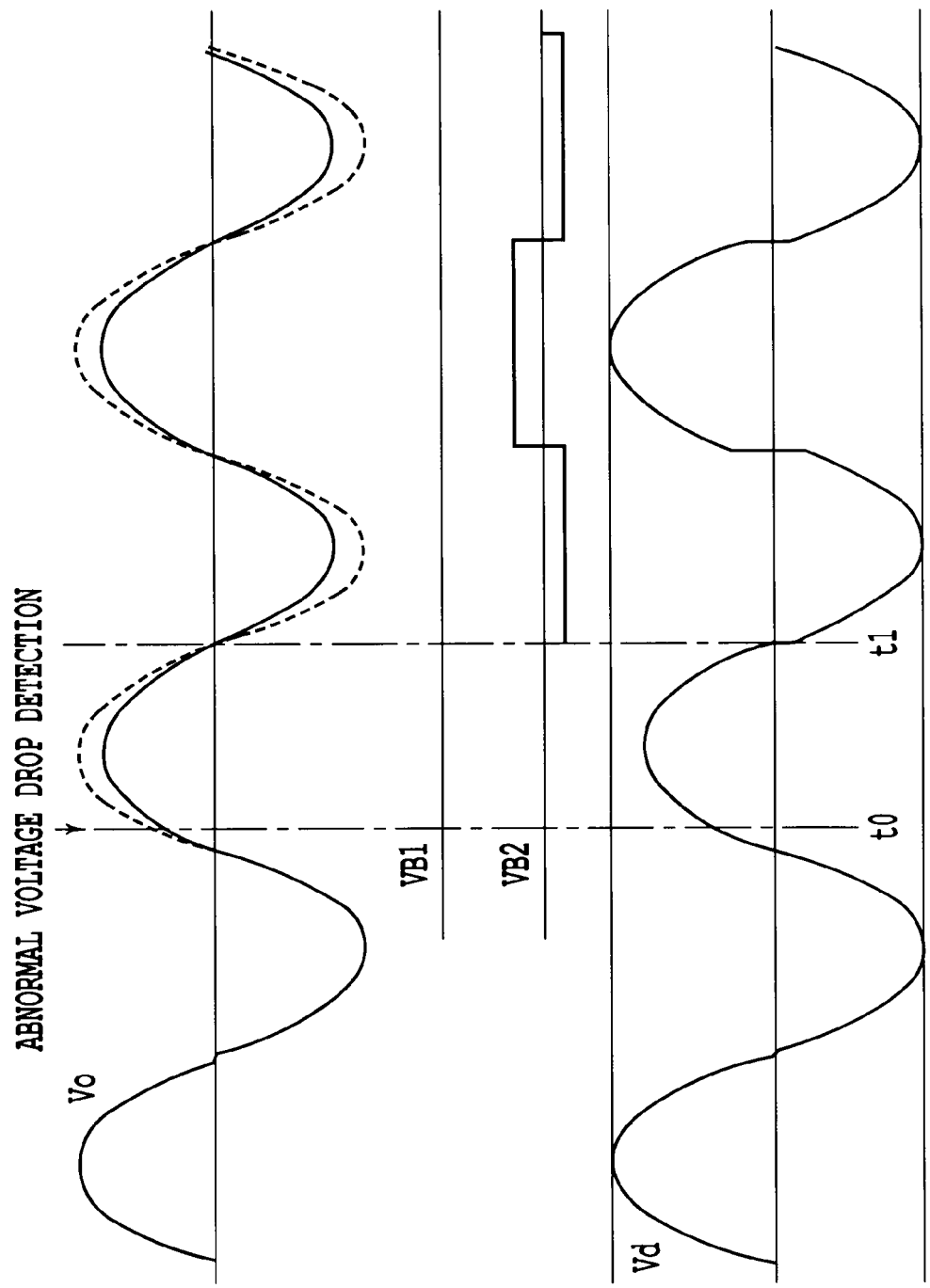
FIG. 3 is an explanatory diagram for a voltage increasing/decreasing operation of the uninterrupted power supply unit shown in FIG. 1.
Figure 4:
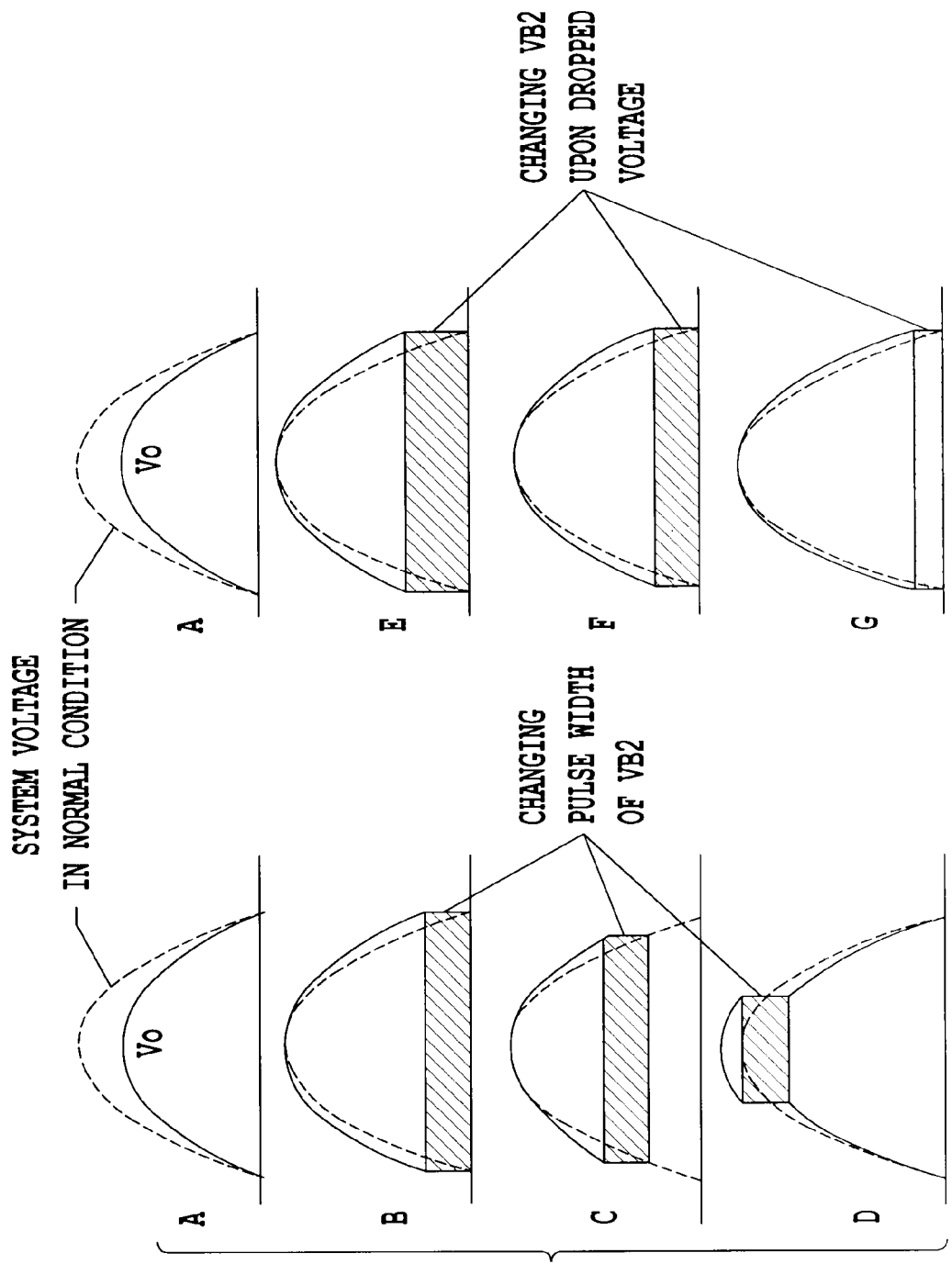
FIG. 4 is a view showing a pattern of a voltage increasing waveform in the uninterrupted power supply unit shown in FIG. 1.
Figure 5:
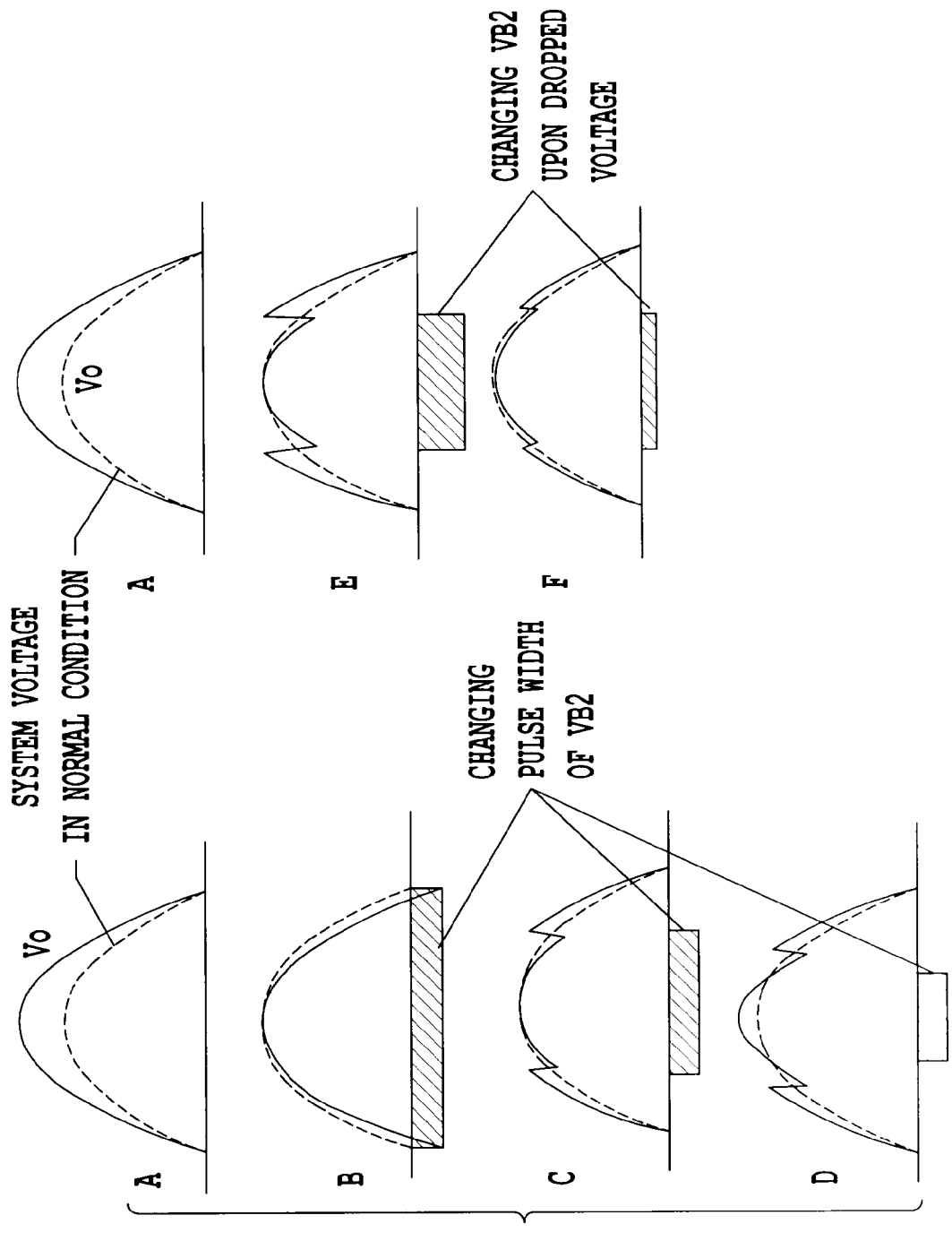
FIG. 5 is a view showing a pattern of a voltage decreasing waveform in the uninterrupted power supply unit shown in FIG. 1.
Figure 6:
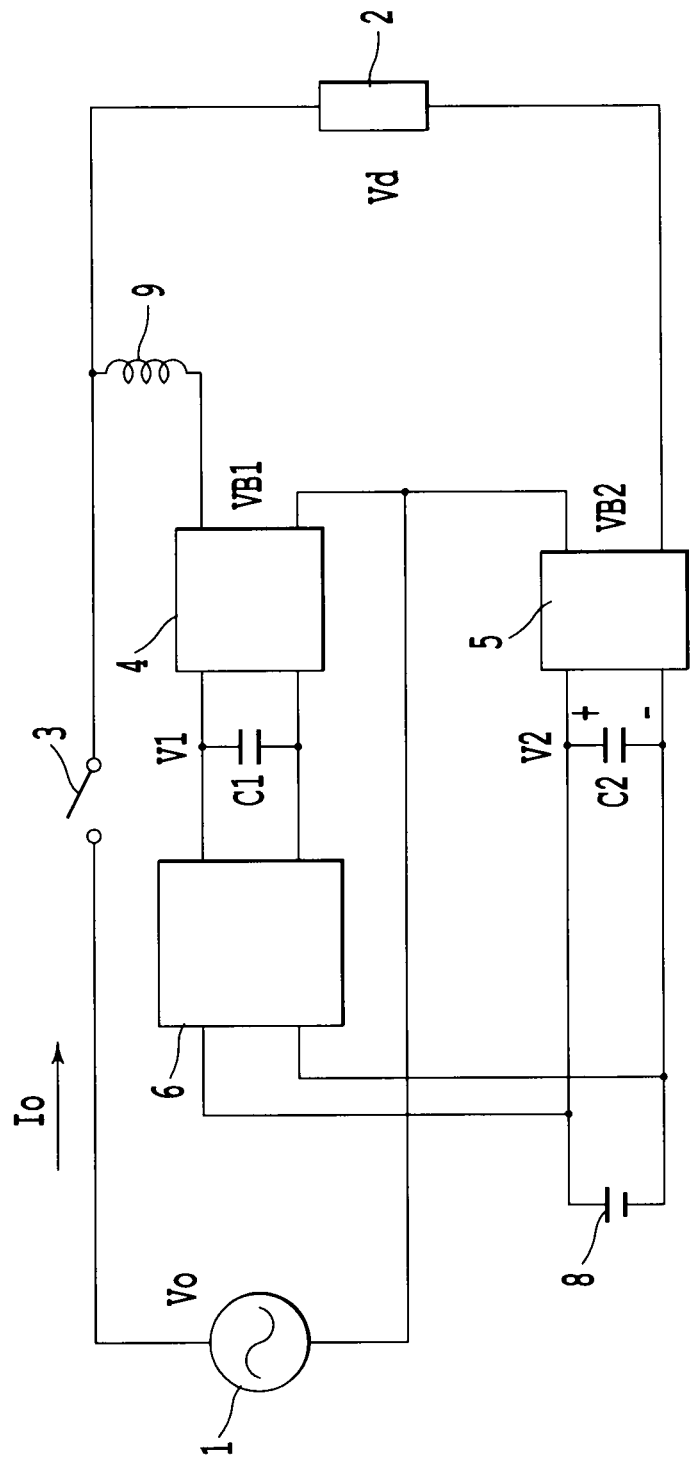
FIG. 6 is a schematic circuit diagram showing the modified example of the uninterrupted power supply unit according to Embodiment 2 of the present invention.
Figure 7:
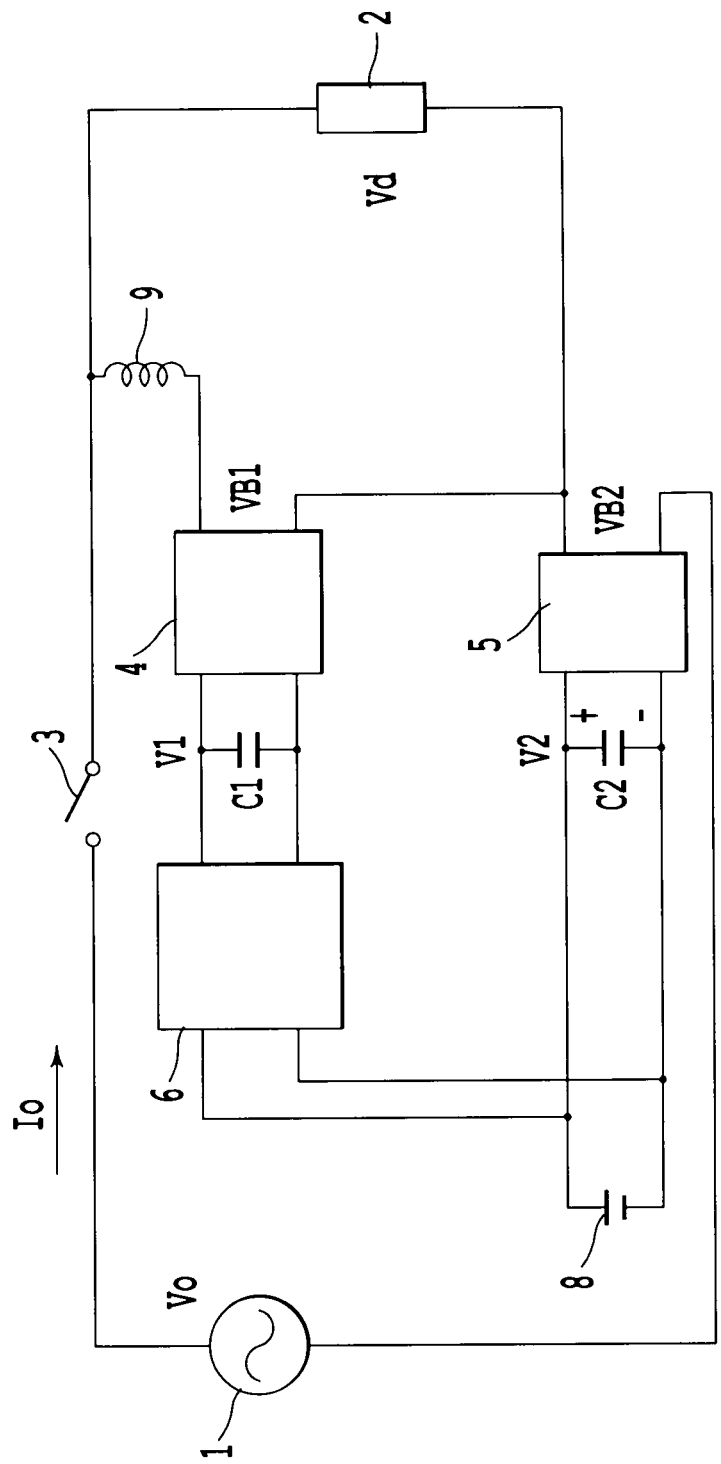
FIG. 7 is a schematic circuit diagram showing the modified example of the uninterrupted power supply unit according to Embodiment 3 of the present invention.
Figure 8:
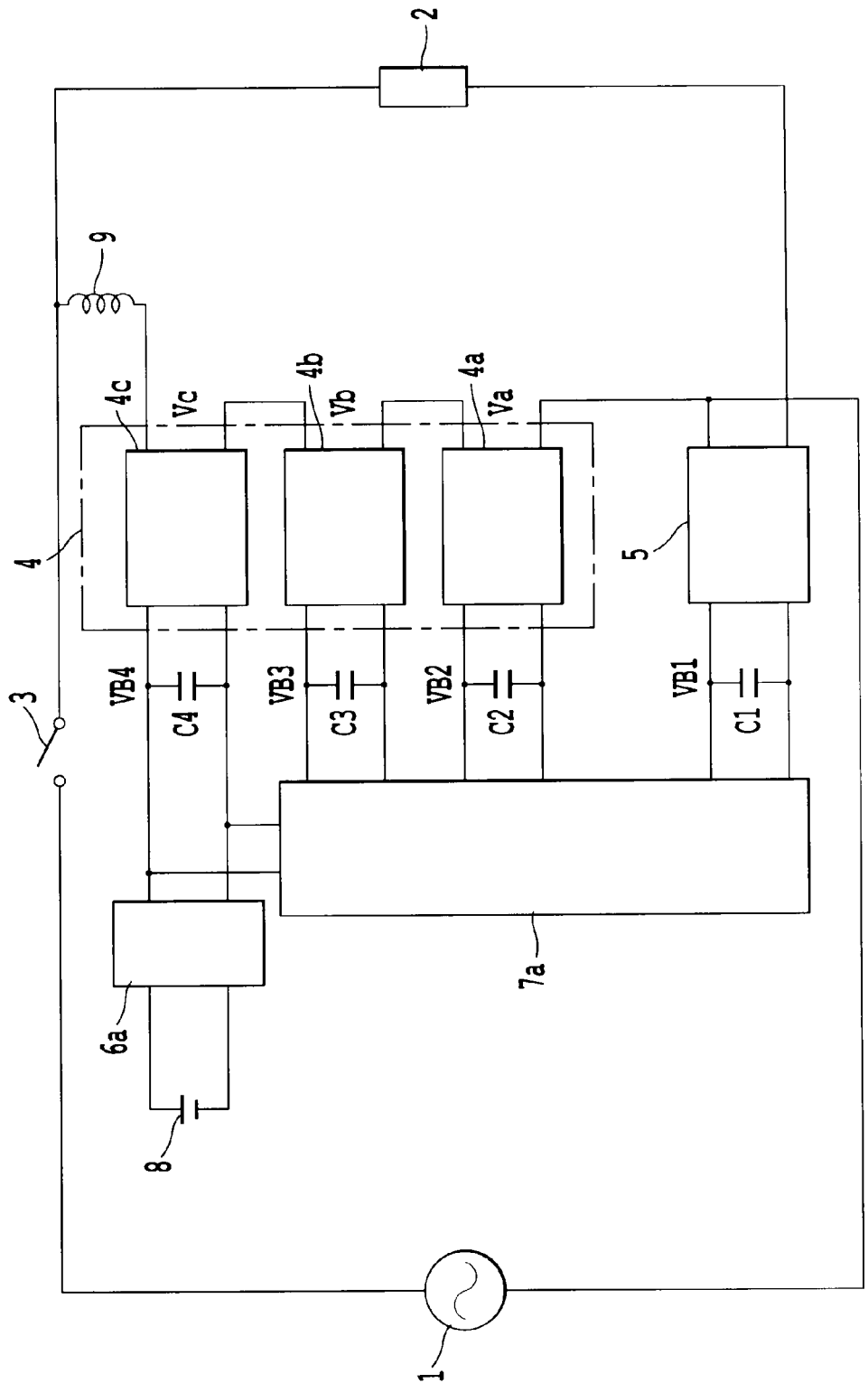
FIG. 8 is a schematic circuit diagram showing the modified example of the uninterrupted power supply unit according to Embodiment 4 of the present invention.
Figure 10:
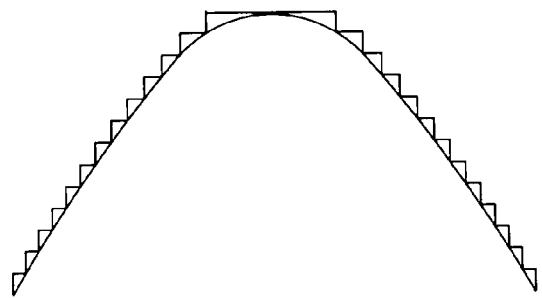
FIG. 10 is a chart showing a relationship between a voltage pattern and a waveform image at a time when a sinusoidal waveform is output, in Embodiment 4 of the present invention.
Figure 11:
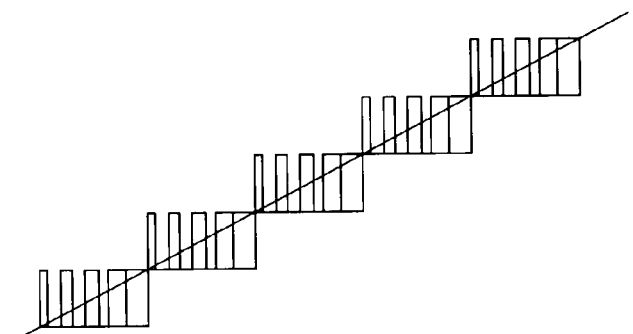
FIG. 11 is a chart showing a waveform at a time when PWM control is taken place among each output level, in Embodiment 4 of the present invention.
Figure 13:
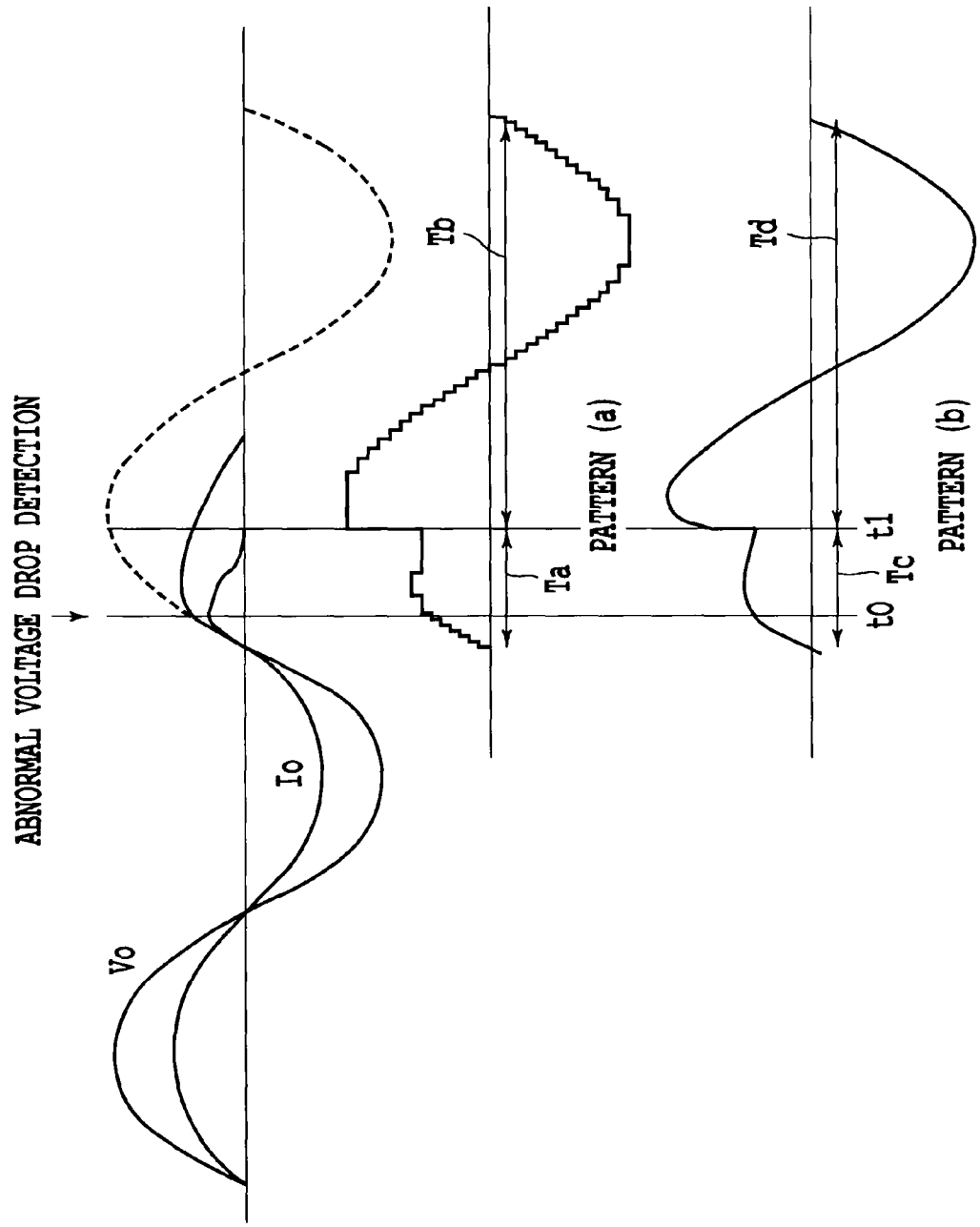
FIG. 13 is a chart showing a waveform at a time when the voltage compensation operation is taken place, in Embodiment 4 of the present invention.
Figure 14:
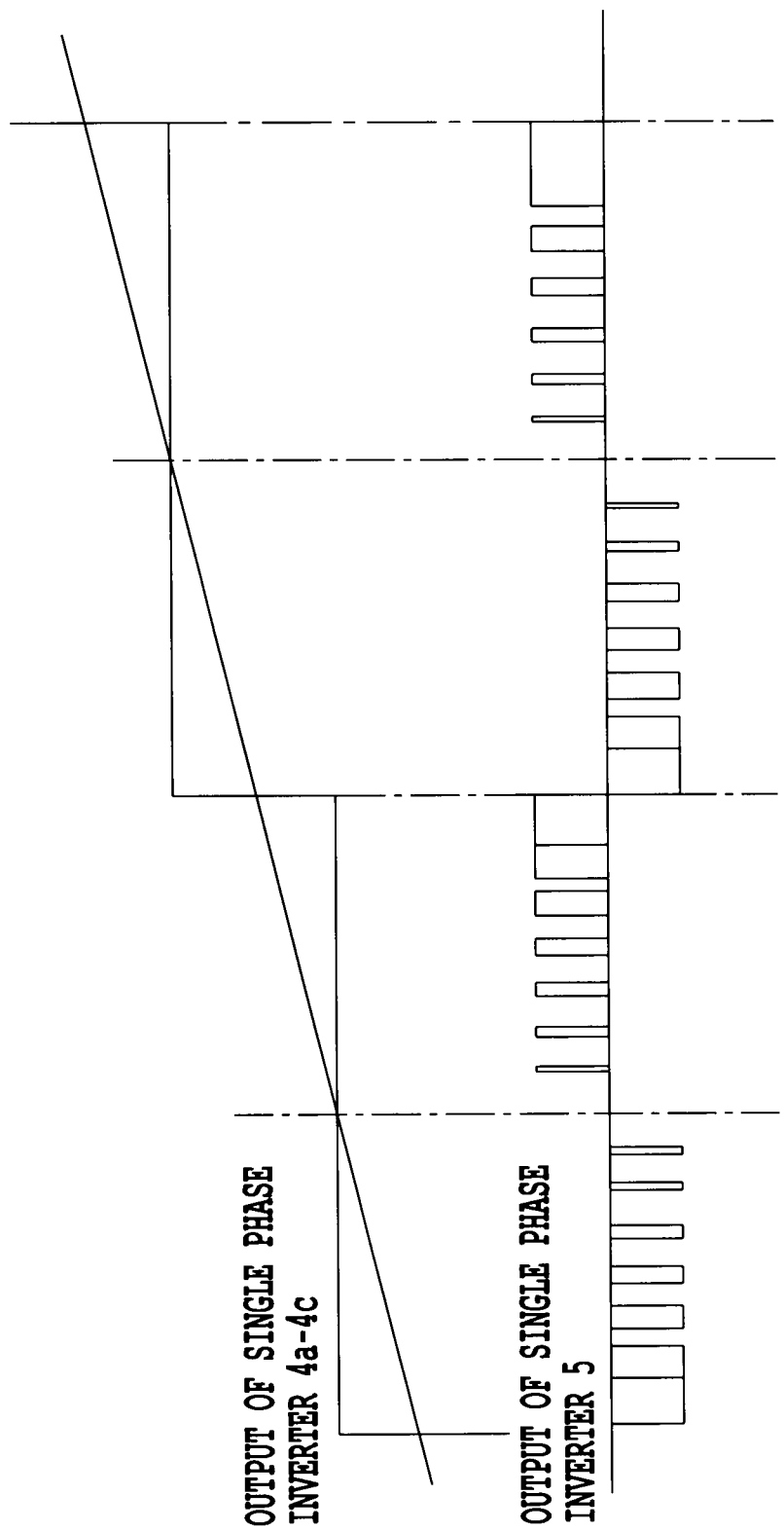
FIG. 14 is a chart showing a relationship between an operation of each inverter and an output waveform, in Embodiment 4 of the present invention.
Figure 15:
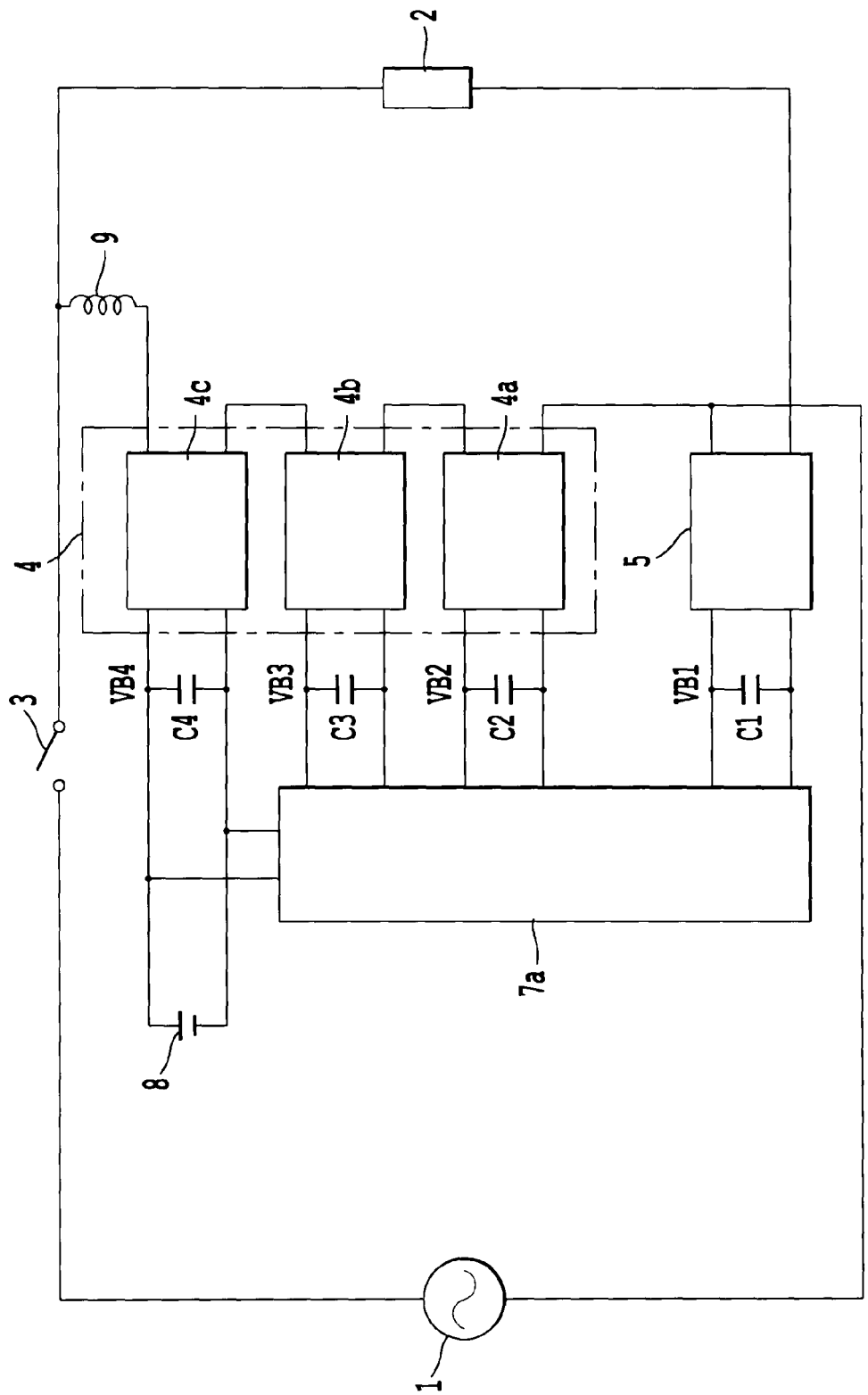
FIG. 15 is a schematic circuit diagram showing the modified example of the uninterrupted power supply unit according to Embodiment 5 of the present invention.
Figure 16:
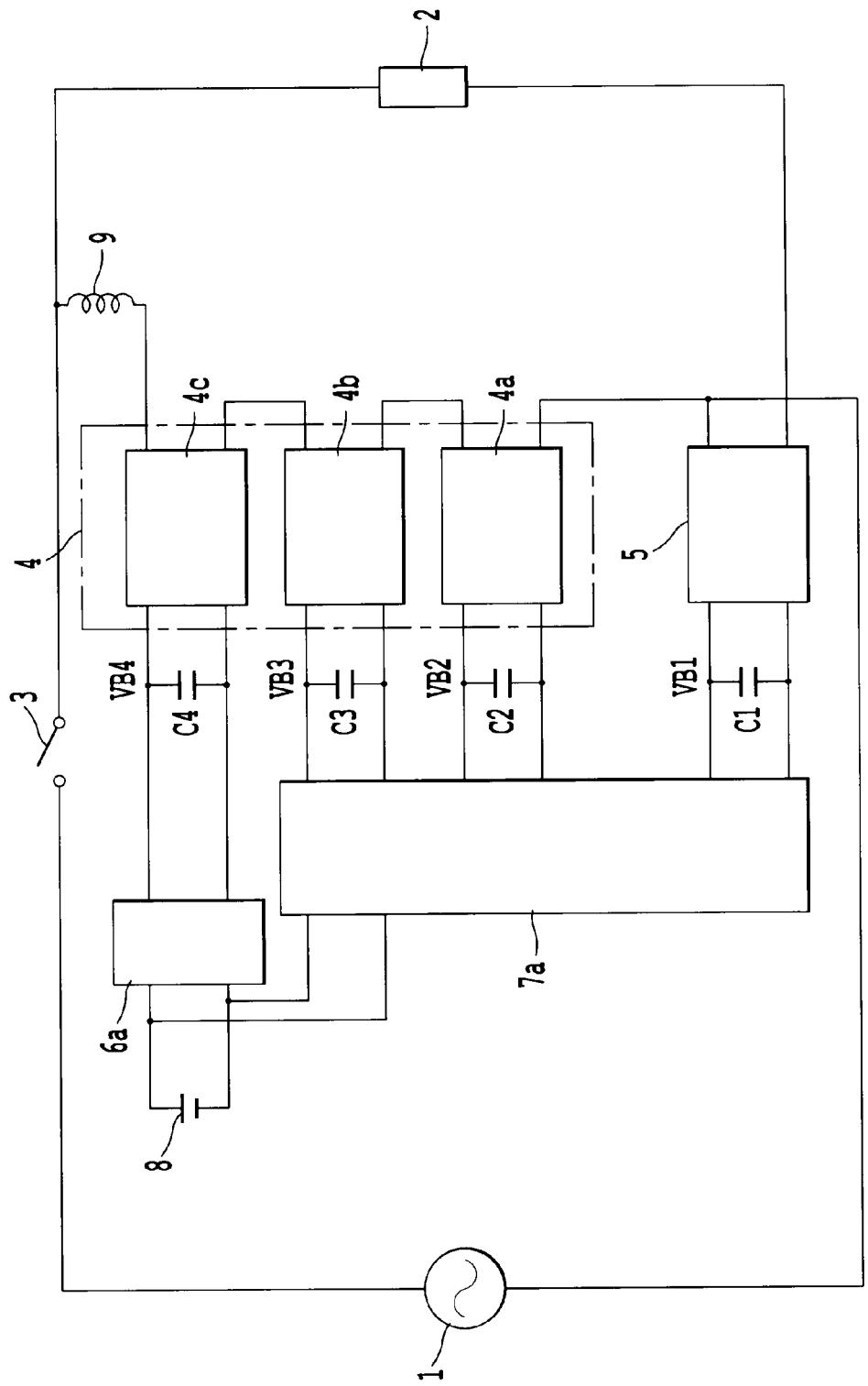
FIG. 16 is a schematic circuit diagram showing the modified example of the uninterrupted power supply unit according to Embodiment 6 of the present invention.
Figure 17:
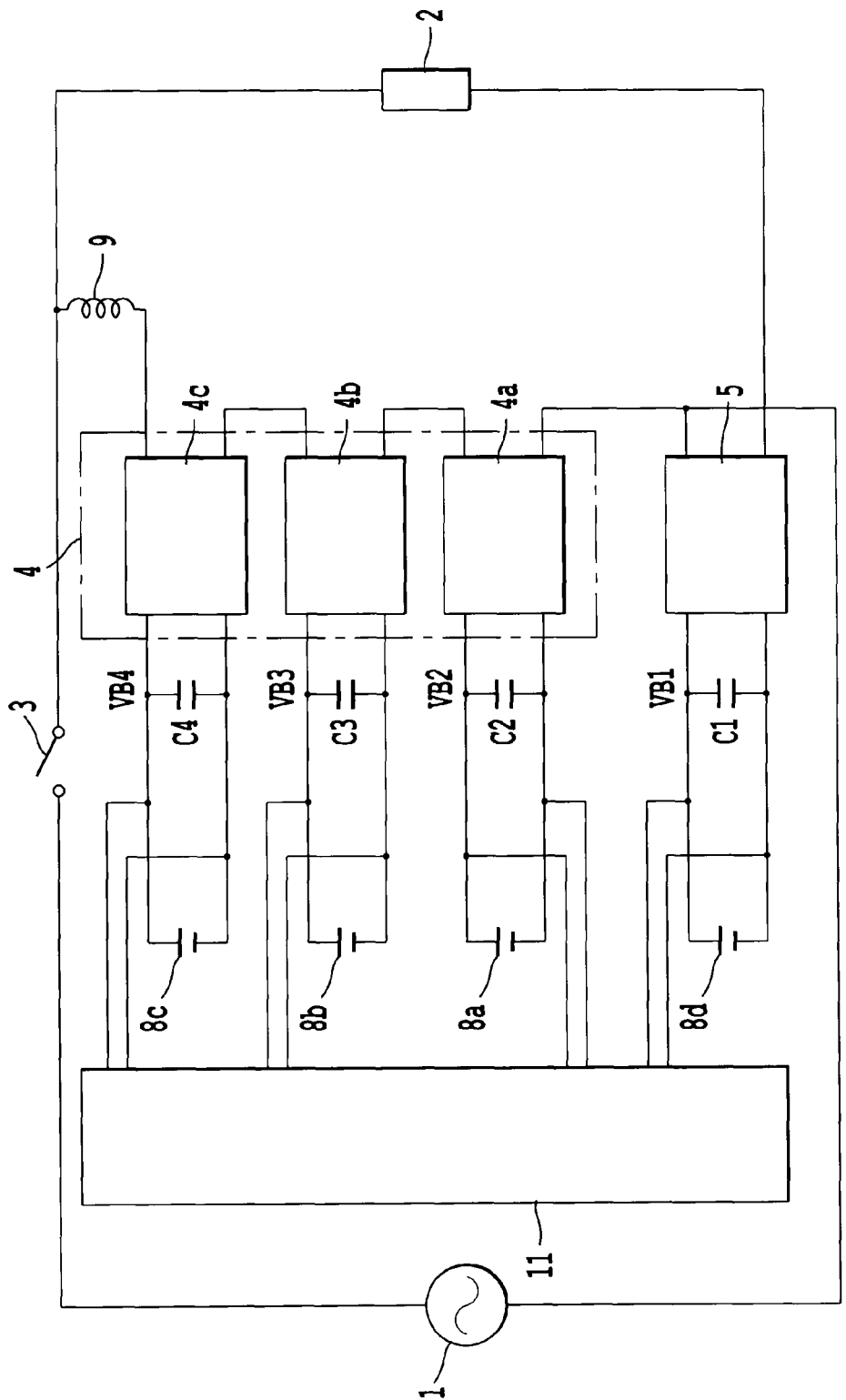
FIG. 17 is a schematic circuit diagram showing the modified example of the uninterrupted power supply unit according to Embodiment 7 of the present invention.
Figure 18:
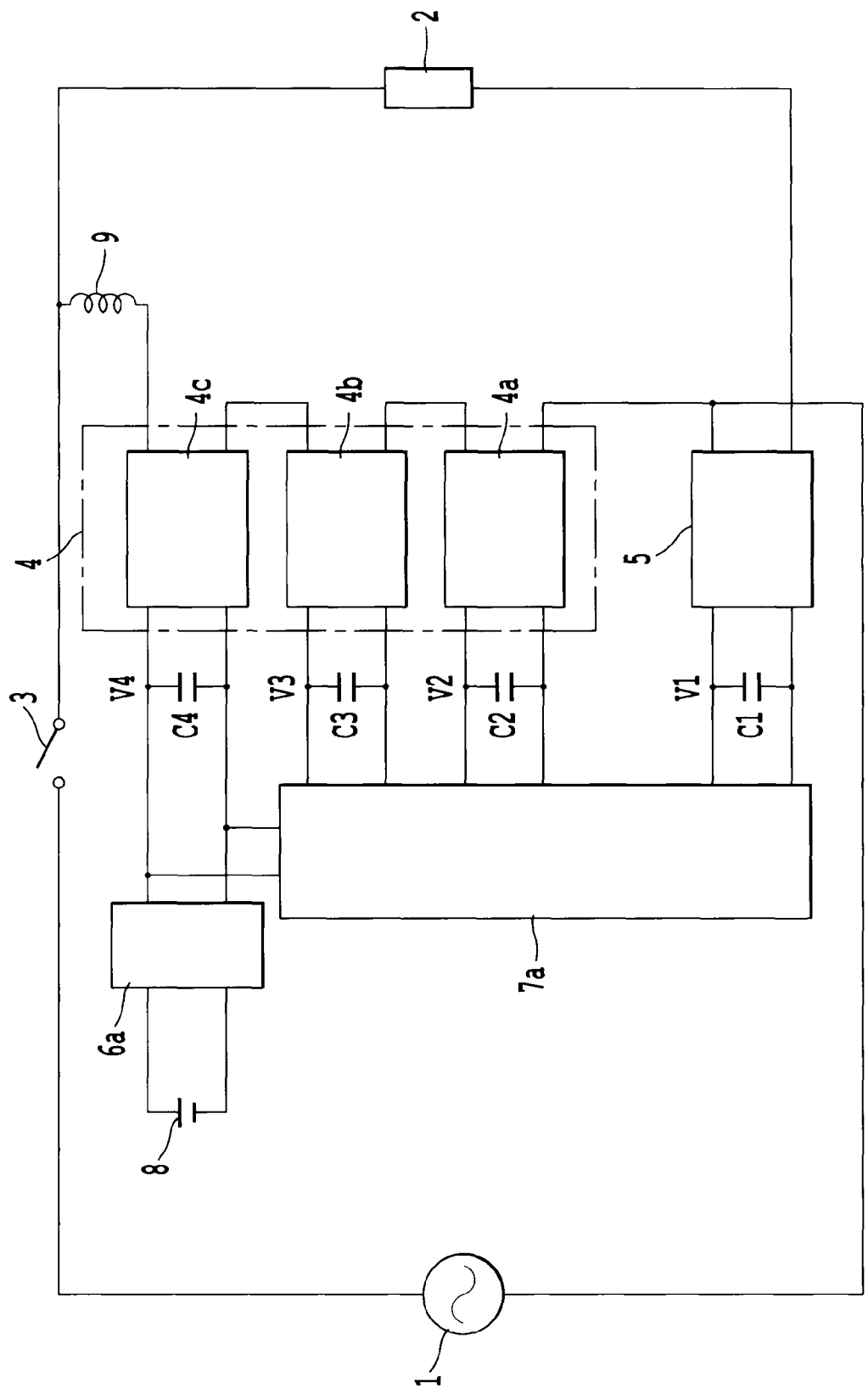
FIG. 18 is a schematic circuit diagram showing the modified example of the uninterrupted power supply unit according to Embodiment 8 of the present invention.

DESCRIPTION OF REFERENCES 1 an alternative current power source
2 a load
3 a straight forward switch
4 a first single phase inverter
5 a second single phase inverter
6,6a a DC-DC converter
7,7a a Dc-DC converter
8 a battery

The invention claimed is:

1. A power supply apparatus comprising:
a straightforward switch connected in series between a power source and a load, and that supplies or interrupts an electric power output from the power source to the load;
a first single phase inverter or rectifier including alternating current (AC) side terminals and direct current (DC) side terminals connected in parallel with the load, and with its AC side terminals connected to the load;
a second single phase inverter or rectifier including alternating current (AC) side terminals and direct current (DC) side terminals connected in series with said load, and with its AC side terminals connected to the load; and
a battery connected to the DC side terminals of said first and second single phase inverters or rectifiers;
wherein at least one of the first or second single phase inverters or rectifiers is connected to the battery through a DC-DC converter, and
wherein said first and second single phase inverters or rectifiers are connected so as to be connected in series with each other when said straightforward switch is open to thereby each supply their respective electric powers to the load by each supplying their respective output voltages to the load.

2. The power supply apparatus according to claim 1, wherein the first and second single phase inverters or rectifiers are connected so that their output voltages are different from each other.

3. The power supply apparatus according to claim 1, wherein the first and second single phase inverters or rectifiers form a pseudo-sinusoidal voltage wave comprising a standard square waveform having a plurality of output levels to output it to the load, by combining their output voltages after a decrease in a system voltage and opening of the straightforward switch.

4. The power supply apparatus according to claim 1, wherein when a power source voltage fluctuates in a normal operating condition, the second single phase inverter or rectifier superimposes a voltage for compensating the fluctuation on the power source voltage by controlling a pulse width or voltage value of the output voltage.

5. The power supply apparatus according to claim 1, wherein the at least one of the first and second single phase inverters or rectifiers is connected to the battery through the DC-DC converter to give and receive energy through the DC-DC converter between both inverters or rectifiers.

6. The power supply apparatus according to claim 1, wherein the first single phase inverter or rectifier is comprised of a plurality of inverters or rectifiers connected in series with each other.

7. The power supply apparatus according to claim 6, wherein at least two of direct current power sources provided to said plurality of single phase inverters or rectifiers constituting said first single phase inverter or rectifier have a voltage relationship of 1:2, or 1:3.

8. The power supply apparatus according to claim 6, wherein said first single phase inverter or rectifier is controlled so that a current which compensates reactive power in a normal condition flows through the power source.

9. The power supply apparatus according to claim 6, wherein said second single phase inverter or rectifier is PWM-controlled so that a direct current voltage of the second single phase inverter or rectifier is 0.5 or more times a direct current voltage of a single phase inverter or rectifier generating a lowest voltage out of the plurality of the inverters or rectifiers comprising the first single phase inverter or rectifier.

10. The power supply apparatus according to claim 1, wherein a direct current voltage of said second single phase inverter or rectifier is changed by said DC-DC converter according to an amount of decreased or increased power source voltage.

11. The power supply apparatus according to claim 1, wherein said straightforward switch is constituted by a mechanical switch or semiconductor switch.

12. The power supply apparatus according to claim 7, wherein said first single phase inverter or rectifier is controlled so that a current which compensates reactive power in a normal condition flows through the power source, switch, and load.

13. The power supply apparatus according to claim 7, further comprising:
a voltage drop detector to detect if a system voltage from said power source abnormally drops in magnitude, and to open said switch when an abnormal system voltage drop is detected.

* * * * *